United States Patent [19]

Matrick

[11] Patent Number: 5,169,436
[45] Date of Patent: Dec. 8, 1992

[54] SULFUR-CONTAINING PENETRANTS FOR INK JET INKS

[75] Inventor: Howard Matrick, Highlands, N.J.

[73] Assignee: E. I. Du Pont de Nemours and Company, Wilmington, Del.

[21] Appl. No.: 882,400

[22] Filed: May 13, 1992

[51] Int. Cl.$^5$ ............................................. C09D 11/02
[52] U.S. Cl. .................. 106/20 D; 106/22 R
[58] Field of Search ...................... 106/20, 22

[56] References Cited

U.S. PATENT DOCUMENTS

| | | | |
|---|---|---|---|
| 4,361,843 | 11/1982 | Cooke et al. | 106/22 |
| 4,627,875 | 12/1986 | Kobayashi et al. | 106/22 |
| 4,790,880 | 12/1988 | Miller | 106/20 |
| 4,840,674 | 6/1989 | Schwarz | 106/20 |
| 5,006,170 | 4/1991 | Schwarz et al. | 106/22 |
| 5,061,316 | 10/1991 | Moffatt | 106/22 |
| 5,098,475 | 3/1992 | Winnik et al. | 106/20 |
| 5,100,471 | 3/1992 | Winnik et al. | 106/22 |

*Primary Examiner*—Shrive Beck
*Assistant Examiner*—Helene Klemanski

[57] ABSTRACT

Aqueous ink jet ink compositions comprising an aqueous carrier medium, a colorant and a sulfoxide or sulfone penetrant having a solubility in water of at least 4.5% at 25° C. and represented by the formula:

$$H(CH_2)_aS(O)_n(CH_2)_bH$$

wherein
a+b=5-8, and
n=1-2;

exhibit rapid drying, excellent image definition, are storage stable and have excellent decap properties.

19 Claims, No Drawings

SULFUR-CONTAINING PENETRANTS FOR INK JET INKS

FIELD OF THE INVENTION

This invention relates to aqueous inks for ink jet printers with selected sulfoxide and sulfone penetrants that impart rapid media penetration without loss of image definition or inducing pigment flocculation.

BACKGROUND OF THE INVENTION

Ink jet printing is a non-impact printing process in which an electronic signal produces droplets of ink that are deposited on a wide variety of substrates such as paper, transparent film, plastics, metals and fabrics. It is extremely versatile in substrate variety, print quality, speed of operation, and is digitally controllable. For these reasons, ink jet is widely used industrially for marking and labeling. In the office environment, it has been broadly utilized as output for personal computers. This is especially true for thermal or bubble jet drop-on-demand printers with disposable ink cartidges. These printers have been widely received due to their high print quality, low cost, relatively quiet operation and graphics capability.

Both dyes and pigments have been used as colorants for ink jet inks. However, dyes have several disadvantages. They are water-soluble and remain so after drying. They are redissolved by contact with water and will run when exposed to a water spill and smear on contact with felt pen markers. In addition, they exhibit poor light stability relative to pigments and are known to fade even under conditions of office fluorescent lighting. Many of these disadvantages prohibit the use of dye-based inks in applications requiring water-fastness and greater light stability.

Pigment-based inks contain cosolvents which provide improved water and smear resistance and improved lightfastness compared to dyes. However, the presence of these cosolvents (including penetrants) tends to destabilize pigment dispersions. Thus, pigments are a useful alternative to dyes provided the pigment dispersions can be made stable to flocculation and settling.

Three major issues dominate ink jet ink technology. They are (1) drying rate, (2) print quality, and (3) reliability. These issues compete in the product formulation process.

Drying rate determines the throughput rate and, therefore, productivity of a printer. One major deficiency of thermal ink jet printers is their relatively slow printing speed compared to printers using competing technologies. A major obstacle is the ink drying rate. Drying occurs by both evaporation and penetration. Evaporation is determined by solvent vapor pressure whereas penetration is determined by interfacial energy between the ink and the print media and the porosity of the print media. The use of penetrants as a means to increase the rate of penetration of inks is known in the art. However, many of the known penetrants cause pigment dispersions to flocculate and therefore cannot be used in pigmented ink jet inks.

Print quality can be somewhat subjective in measurement. Essentially, it is the image definition or contrast verses the nonimage background areas. It is controlled by two general factors:

1) Color properties of the ink which are measured by optical density and color coordinates controlling hue, e.g., L*, A* and B* in the CIELAB 1976 color standards. In the case of black inks, optical density is the most important factor.

2) Non-color image characteristics which determine the definition of the image are: a) resolution, i.e., number of drops of ink per unit area; b) the area coverage per drop, c) edge acuity; and d) presence or absence of artifacts such as satellite droplets, side pennants or feathering. Feathering in particular is an important phenomenon because it is often the result of a fast penetrating ink which conducts ink through paper fibers producing a fuzzy or feathery image.

An important reliability issue is decap or crust time which is defined as the time span over which a pen can be exposed to the atmosphere without failing to fire. Other reliability issues are stability of the ink caused by physical or chemical changes, compatibilty with equipment material, robustness towards variability in thermal firing conditions and stable drop volume over long term use.

In developing ink compositions, it is often necessary to sacrifice one or more of these properties to increase or improve the others. For example, methods for increasing drying rate will adversely affect either print quality or reliability. Using a more volatile cosolvent will decrease drying time but also decrease decap time. Using a more penetrating solvent will raise drying rate but will also lower optical density and induce feathering. Increasing optical density by employing more colorant can adversely effect reliability. Faster penetrating cosolvent improve the drying rate, but many of them will destabilize pigment dispersions.

Accordingly, a need exists for penetrants that will increase ink drying without degrading print quality through feathering and without destabilizing pigment-based inks.

The penetrants of this invention are able to increase the penetration rate thereby increasing drying rate without inducing feathering or reducing decap time or decreasing pigment dispersion stability . These penetrants are also useful in dye-based inks.

SUMMARY OF THE INVENTION

The penetrants of the invention have the ability impart rapid drying by media penetration without excessive loss of image definition, they are compatible with aqueous pigment dispersions, they do not induce pigment flocculation or settling, they do not adversely affect decap or nozzle pluggage, and they do not induce feathering. They are also useful in dye-based inks.

In accordance with this invention there is provided an aqueous ink jet ink composition comprising:
(a) an aqueous carrier medium,
(b) a colorant; and
(c) a sulfoxide or sulfone compound having a solubility in water of at least 4.5 parts in 100 parts of water at 25° C., and which is represented by the formula:

$H(CH_2)_aS(O)_n(CH_2)_bH$ wherein $a+b=5-8$, and $n=1-2$.

The inks compositions of the invention are stable, have low viscosity, exhibit excellent print quality, provide excellent smear resistance after drying and good decap or crusting time. They may be used with a variety of ink jet printers such as continuous, piezoelectric, drop-on-demand and thermal or bubble jet drop-ondemand, and are particularly adapted for use in thermal ink jet printers.

DETAILED DESCRIPTION OF THE INVENTION

The invention relates to aqueous ink jet ink compositions which are particularly suited for use in ink jet printers in general, and thermal ink jet printers in particular. The aqueous ink jet ink compositions encompasses both pigment-based inks and dye-based inks. The ink compositions are particularly advantageous when the colorant is a pigment dispersion. However, the cosolvents can also be used in aqueous dye-based ink to impart rapid drying and good image definition to these inks.

The pigment-based inks comprise an aqueous carrier medium, a selected sulfoxide or sulfone penetrant and a pigment dispersion. The dye-based inks comprise an aqueous carrier medium, a dye and a selected sulfoxide or sulfone penetrant.

The inks of this invention may be adapted to the requirements of a particular ink jet printer to provide a balance of light stability, smear resistance, viscosity, surface tension, high optical density, and crust resistance.

Another advantage is the freedom of the sulfoxide or sulfone penetrants from hydrolysis in aqueous inks.

Aqueous Carrier Medium

The aqueous carrier medium comprises water (preferably deionized water) or a mixture of water and at least one water soluble organic solvent other than the selected sulfoxide or sulfone penetrant. The aqueous carrier medium is present in a major amount of the ink composition, i.e., in the range of approximately 65 to 99.89%, preferably approximately 85 to 98.5%, based on total weight of the ink. Representative examples of water-soluble organic solvents are disclosed in U.S. Pat. No. 5,085,698, the disclosure of which is incorporated herein by reference.

Selection of a suitable mixture of water and water soluble organic solvent depends upon the requirements of the specific application, such as desired surface tension and viscosity, the selected colorant, drying time of the ink, and the type of substrate onto which the ink will be printed.

A mixture of a water soluble organic solvent having at least two hydroxyl groups (diethylene glycol, triethylene glycol, etc.) and deionized water is preferred as the aqueous carrier medium. The aqueous carrier medium usually contains from about 5% to about 95% water, with the remainder (i.e., 95% to about 5%) being the water soluble organic solvent. The preferred ratios are approximately 60% to about 95% water, based on the total weight of the aqueous carrier medium. Higher concentrations of organic solvent may result in poor print quality. Lower concentrations may lead to drying out of the printhead or "crusting" of the ink.

Colorants

The colorants useful in the present invention may be a pigment dispersion or a dye. The term pigment dispersion, as is known in the art and as used herein, refers to a mixture of a pigment and a dispersing agent. Preferably, the dispersing agent is a polymeric dispersant compound.

Dyes which are commonly used in aqueous ink jet inks, such as for example, Acid, Direct, Food and Reactive dyes, are suitable colorants for the ink compositions of the present invention. The ink compositions of this invention may contain up to about 20% dye, by weight, based on the total weight of the ink composition.

In the preferred embodiment of the present invention, the colorant is a pigment dispersion. In addition to, or in place of the preferred polymeric dispersant compounds, surfactant compounds may be used as dispersants. These may be anionic, cationic, nonionic, or amphoteric surfactants. A detailed list of non-polymeric as well as some polymeric dispersants are listed in the section on dispersants, pages 110–129, 1990 McCutcheon's Functional Materials, North American Edition, Manufacturing Confection Publishing Co., Glen Rock, N.J., the disclosure of which is incorporated herein by reference.

Polymeric dispersants suitable for practicing the invention include AB, BAB and ABC block copolymers. In AB or BAB block copolymers the A segment is a hydrophobic (i.e., water insoluble) homopolymer or copolymer which serves to link with the pigment and the B block is a hydrophilic (i.e., water soluble) homopolymer or copolymer, or salts thereof, and serves to disperse the pigment in the aqueous medium. Such polymeric dispersants and the synthesis thereof are disclosed in U.S. Pat. No. 5,085,698, the disclosure of which is incorporated herein by reference.

Preferred AB block polymers are: methyl methacrylate//methyl methacrylate/methacrylic acid (10//5/7.5), 2-ethylhexyl methacrylate//2-ethylhexyl methacrylate/methacrylic acid (5//5/10), n-butyl methacrylate//n-butyl methacrylate/methacrylic acid (10//5/10), n-butyl methacrylate//methacrylic acid (10//10), ethylhexyl methacrylate//methyl methacrylate/methacrylic acid (5//10/10), n-butyl methacrylate//2-hydroxyethyl methacrylate/methacrylic acid (5//10/10), n-butyl methacrylate//2-hydroxyethyl methacrylate/methacrylic acid (15//7.5/3), methyl methacrylate//ethylhexyl methacrylate/ methacrylic acid (5//5/10), and butyl methacrylate//butyl methacrylate/dimethylaminoethyl methacrylate (5//5/10).

Preferred BAB block polymers are: n-butyl methacrylate/methacrylic acid//n-butyl methacrylate//n-butyl methacrylate/methacrylic acid (5/10//10//5/10), and methyl methacrylate/methacrylic acid//methyl methacrylate//methyl methacrylate/methacrylic acid (5/7.5//10//5/7.5). In the above identification of polymers, the double slash indicates a separation between blocks, a single slash indicates a random copolymer, and the values in parenthesis represent the degree of polymerization of each monomer.

To solubilize the B block into the aqueous medium, it may be necessary to make salts of either the acid or amino groups contained in the B block. Salts of the acid monomers can be made with the counter component being selected from organic bases such as mono-, di-, tri-methylamine, morpholine, n-methyl morpholine; alcohol amines such as dimethylethanolamine (DMEA), methyldiethanolamine, mono-, di-, and tri-ethanolamine; pyridine; ammonium hydroxide; tetra-alkylammonium salts such as tetramethylammonium hydroxide, tetraethylammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers.

Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetraalkyl ammonium salt. Amphoteric polymers, that is polymer that contains both an acid group and an amino group, may be used as is or can be neutralized with either addition of acid or base.

ABC triblock polymers useful in this invention are disclosed in Assignee's copending application U.S.S.N. 07/838,181 filed Feb. 20, 1992, the disclosure of which is incorporated herein by reference.

Although random copolymers can be used as dispersing agents, they are not as effective in stabilizing pigment dispersions as the block polymers, and therefore are not preferred.

The acrylic block polymer is present in the range of approximately 0.1 to 30% by weight of the total ink composition, preferably in the range of approximately 0.1% to 8%. If the amount of polymer becomes too high, the ink color density will be unacceptable and it will become difficult to maintain desired ink viscosity. Dispersion stability of the pigment particles is adversely affected if insufficient acrylic block copolymer is present.

Useful pigments for the dispersion comprise a wide variety of organic and inorganic pigments, alone or in combination. The term "pigment" as used herein means an insoluble colorant. The pigment particles should be sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. Small particles are also desirable for maximum color strength. The range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698, which is incorporated herein by reference.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

Sulfoxide and Sulfone Penetrants

The selected sulfoxide or sulfone penetrants have a solubility in water of at least 4.5% (i.e., 4.5 parts in 100 parts of water) at 25° C. and have the general structure:

$$H(CH_2)_aS(O)_n\text{-}(CH_2)_bH$$

wherein $a+b=5\text{-}8$, and $n=1\text{-}2$.

These compounds may be identified as follows:

| wherein | R—S(O)$_n$—R' | | a + b |
|---|---|---|---|
| | R | R' | |
| | —C$_2$H$_5$ | —C$_3$H$_7$ | 5 |
| | —CH$_3$ | —C$_4$H$_9$ | 5 |
| | —CH$_3$ | —C$_5$H$_{11}$ | 6 |
| | —C$_2$H$_5$ | —C$_4$H$_9$ | 6 |
| | —C$_3$H$_7$ | —C$_3$H$_7$ | 6 |
| | —CH$_3$ | —C$_6$H$_{13}$ | 7 |
| | —C$_2$H$_5$ | —C$_5$H$_{11}$ | 7 |
| | —C$_3$H$_7$ | —C$_4$H$_9$ | 7 |
| | —C$_4$H$_9$ | —C$_4$H$_9$ | 8 |
| | —C$_3$H$_7$ | —C$_5$H$_{11}$ | 8 |
| | —C$_2$H$_5$ | —C$_6$H$_{13}$ | 8 |
| | —CH$_3$ | —C$_7$H$_{15}$ | 8 |

Where —C$_3$H$_8$, —C$_4$H$_9$, —C$_5$H$_{11}$, —C$_6$H$_{13}$ and —C$_7$H$_{15}$ represent all possible isomers and $n = 1\text{-}2$.

Some sulfoxides and sulfones, especially dimethyl sulfoxide and tetramethylene sulfone or sulfolane, are known as cosolvents for aqueous ink jet inks. As demonstrated in the examples below, however, these compounds are not effective penetrants. Dimethyl sulfoxide dries in 45-60 seconds which is extremely slow. Tetramethylene sulfone dries in 30-45 seconds as do most sulfoxides and sulfones under the conditions of the drying test. Only the sulfone and sulfoxide compounds of this invention have been shown to provide outstanding stability, fast drying times and no feathering.

Similarly, benzenoid compounds are of little utility in ink jet inks because almost all such compounds are insoluble in the ink carrier vehicle. Compounds with oxygen-containing functional groups other than sulfone or sulfoxide groups are inferior to the sulfoxide and sulfone compounds of this invention.

As little as 1% penetrant has some effect, but about 3-10% is a preferred range. Up to 15% may be used to increase drying rate, less preferably up to 55%, and least preferably up to 70%, but this increased penetration/drying rate must be balanced against increased feathering and decreased dispersion stability. The amount of aqueous carrier medium plus penetrant is in the range of approximately 70 to 99.8%, preferably approximately 94 to 99.8%, based on total weight of the ink when an organic pigment is selected, approximately 25 to 99.8%, preferably approximately 70 to 99.8% when an inorganic pigment is selected and 80 to 99.8% when a dye is selected.

Other Ingredients

The ink may contain other ingredients. For example, the surfactants mentioned above may be used to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for the specific substrate to be used in printing. In aqueous inks, the surfactants may be present in the amount of 0.01–5% and preferably 0.2–2%, based on the total weight of the ink.

Biocides may be used in the ink compositions to inhibit growth of microorganisms. Dowicides ® (Dow Chemical, Midland, Mich.), Nuosept ® (Huls America, Inc., Piscataway, N.J.), Omidines ® (Olin Corp., Cheshire, Conn.), Nopcocides ® (Henkel Corp., Ambler, Pa.), Troysans ® (Troy Chemical Corp., Newark, N.J.) and sodium benzoate are examples of such biocides.

In addition, sequestering agents such as EDTA may also be included to eliminate deleterious effects of heavy metal impurities.

Other known additives, such as humectants, viscosity modifiers and other acrylic or non-acrylic polymers made also be added to improve various properties of the ink compositions.

Ink Preparation

The ink compositions of the present invention are prepared according to methods well known in the art. A pigment-based ink is prepared by premixing the selected pigment(s) and dispersant(s) in water. The sulfoxide or sulfone penetrants, as well as desired cosolvents, may be present during the dispersion step.

The dispersing step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium.

In the preparation of dye-based inks, some of the same factors apply except that there is no dispersant present and no need for pigment deaggregation. The dye-based ink is prepared in a well agitated vessel rather than in dispersing equipment.

It is generally desirable to make the ink in concentrated form, which is subsequently diluted to the appropriate concentration for use in the ink jet printing system. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP at 20° C., and preferably in the range of about 1 cP to about 10 cP at 20° C.

The ink compositions of this invention have physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They have excellent storage stability for a long period and do not clog in an ink jet apparatus. Fixing the ink on the image recording material, such as, paper, fabric, film, etc., can be carried out rapidly and accurately.

The printed ink images have clear color tones, high density, excellent water resistance and lightfastness. Furthermore, the inks are compatible with components of the ink jet printing device.

EXAMPLES

The following examples further illustrate but do not limit the invention.

Dispersant Preparation

A block copolymer of n-butyl methacrylate and methacrylic acid was prepared by adding 3750 grams of tetrahydrofuran and 7.4 grams of p-xylene to a 12-liter flask equipped with a mechanical stirrer, thermometer, nitrogen inlet, drying tube outlet, and addition funnels. The catalyst, tetrabutyl ammonium m-chlorobenzoate (3.0 ml of a 1.0M solution in acetonitrile), was then added to the flask. 291.1 grams (1.25 mol) of an initiator, 1,1-bis(trimethyl-siloxy)-2-methyl propene, was injected. Feed I which consisted of tetrabutyl ammonium m-chlorobenzoate (3.0 ml of a 1.0M solution in acetonitrile), was started at 0 minutes and added over 150 minutes. Feed II which consisted of 1976 gm (12.5 mol) trimethylsilyl methacrylate, was started at 0 minutes and added over 35 minutes. 180 minutes after Feed II was completed (over 99% of the monomers had reacted), Feed III, which consisted of 1772 gm (12.5 mol) butyl methacrylate, was started and added over 30 minutes.

At 400 minutes, 780 grams of dry methanol were added to the above solution and distillation commenced. During the first stage of distillation, 1300.0 grams of material with a boiling point below 55° C. were removed from the flask. The theoretical amount of methoxytrimethylsilane, having a boiling point of 54° C., to be removed was 1144.0 grams. Distillation continued during the second stage while the boiling point increased to 76° C. 5100 gms of isopropanol were added during the second stage of distillation. A total of 7427 grams of solvent were removed. The resultant resin solution contained 55.8% solids and had a neutralization equivalent of 4.65 milliequivalents of potassium hydroxide per gram of solids.

The dispersant was neutralized by mixing 200.0 grams of dispersant solution with 174.4 grams of 15% aqueous KOH solution and 137.6 grams of deionized water in a roller mill for 3–4 hours, followed by magnetic stirring 16–20 hours to give a slightly cloudy solution.

Preparation of Pigment Dispersion

The following materials were added to a 1 liter beaker:
- 78.3 grams deionized water
- 66.7 grams neutralized dispersant solution
- 3.0 grams 15% aqueous KOH solution The solution was mechanically stirred while 20.0 grams of carbon black pigment, FW 18 (Degussa Corp., Ridgefield Park, N.J.) was added in portions. Stirring was continued for 30 minutes. The contents were then added to a Mini Motormill 100 (Eiger Machinery Inc., Bensenville, Ill.) with another 32 grams of deionized water as a rinse. The contents were milled at 3500 rpm for one hour. The yield was 190.8 grams. The pH was 7.6. The particle size was 138 nm as determined by a Brookhaven BI-90 Particle Analyser (Brookhaven Instruments Corp., Holtsville, N.Y.).

Preparation of Inks

The following ingredients were combined and added with magnetic stirring over 10–15 minutes to 22.5 grams of the above pigment dispersion:

- 2.6 grams diethylene glycol (Aldrich Chemical Co. Inc., Milwaukee, Wis.)
- 2.6 grams cosolvent or penetrant (Table 1, below)
- 0.5 grams Silwet ® L-77 (Union Carbide Corp., Danbury, Conn.)
- 37.2 grams deionized water

TABLE 1

Cosolvents And Penetrants Identification

| Cosolvents | Control # |
|---|---|
| Dimethyl Sulfoxide | 1 |
| Dimethyl Sulfone | 2 |
| Methyl Ethyl Sulfone (Phillips Petroleum Co., Bartlesville, OK) | 3 |
| Diethyl Sulfone | 4 |
| Tetramethylene Sulfoxide | 5 |
| Tetramethylene Sulfone (Sulfolane) | 6 |
| 3-Methylsulfolane | 7 |
| 2,4-Dimethylsulfolane | 8 |
| 2,5-dihydro-thiophene-1,1-dioxide | 9 |
| 3-Ethyl-2,5-dihydro-thiophene-1,1-dioxide | 10 |
| Methyl Phenyl Sulfoxide | 11 |
| Methyl Phenyl Sulfone | 12 |
| 2-(Methylsulfonyl)ethanol | 13 |
| 2,2' Sulfonyldiethanol | 14 |
| Thioxane Dioxide (filtered) | 15 |
| Benzyl Sulfoxide | 16 |
| Benzyl Sulfone | 17 |
| Phenyl Sulfoxide | 18 |
| Phenyl Sulfone | 19 |

| Penetrants | Example # |
|---|---|
| Di-n-propyl Sulfoxide | 1 |
| Di-n-propyl Sulfone (Phillips Petroleum Co.) | 2 |
| Di-isobutyl Sulfoxide (Columbia Organic Chemical Co.) | 3 |

All sulfoxide and sulfone comparative cosolvents and penetrants were obtained from Aldrich Chemical Co. Inc., Milwaukee, Wis. unless otherwise stated.

Drying Test

Drying times were obtained by printing rapidly a series of solid patterns on a Hewlett Packard DeskJet printer (Hewlett Packard Co., Palo Alto Calif.), immediately wiping them in 15 second increments, and recording the time in which the printed ink would no longer smear. A semiabsorbent paper, Gilbert Bond (Mead Co., Dayton, Ohio) was used. Cosolvents with a rating of 15 seconds gave trace smears at the 15 second interval and no visible smear at 30 seconds. Cosolvents identified as insoluble were not converted to inks.

TABLE 2

| Sample | Dry Time, seconds |
|---|---|
| Control 1 | 45–60 |
| Control 2 | 30–45 |
| Control 3 | 15–30 |
| Control 4 | 30–45 |
| Control 5 | 30–45 |
| Control 6 | 30–45 |
| Control 7 | 30–45 |
| Control 18 | 30–45 |
| Control 19 | 30–45 |
| Control 10 | 30–45 |
| Control 11 | 15–30 |
| Control 12 | INSOLUBLE |
| Control 13 | 15–30 |
| Control 14 | 30–45 |

TABLE 2-continued

| Sample | Dry Time, seconds |
|---|---|
| Control 15 | 30–45 |
| Control 16 | INSOLUBLE |
| Control 17 | INSOLUBLE |
| Control 18 | INSOLUBLE |
| Control 19 | INSOLUBLE |
| Example 1 | 15 |
| Example 2 | 15 |
| Example 3 | 15 |

Stability Test

Dispersion stability was measured by subjecting 15 gram samples of ink to four temperature cycles, each consisting of 4 hours at $-20°$ C. and 4 hours at $60°$ C. Particle sizes were measured on a Brookhaven BI-90 (Brookhaven Instruments Corp., Holtsville, N.Y.) before and after cycling. Particle size changes of 0–5 nm were considered excellent, 5–10 good, 10–19 fair and 20 or greater poor.

TABLE 3

Dispersion Stability

| Sample | Change in Particle Size delta nanometers |
|---|---|
| Control 1 | 4 |
| Control 2 | 5 |
| Control 3 | 3 |
| Control 4 | 6 |
| Control 5 | 13 |
| Control 6 | 9 |
| Control 7 | 14 |
| Control 8 | 76 |
| Control 9 | 89 |
| Control 10 | INSOLUBLE |
| Control 11 | 21 |
| Control 12 | INSOLUBLE |
| Control 13 | 0 |
| Control 14 | 19 |
| Control 15 | 3 |
| Control 16 | INSOLUBLE |
| Control 17 | INSOLUBLE |
| Control 18 | INSOLUBLE |
| Control 19 | INSOLUBLE |
| Example 1 | 4 |
| Example 2 | 6 |
| Example 3 | 17 |

What is claimed is:

1. An aqueous ink jet ink composition comprising:
   (a) an aqueous carrier medium,
   (b) a colorant; and
   (c) a sulfoxide or sulfone penetrant having a solubility in water of at least 4.5% at $25°$ C., and which is represented by the formula:

$$H(CH_2)_aS(O)_n(CH_2)_bH$$

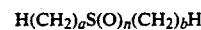

wherein $a+b=5-8$, and $n=1-2$.

2. The ink composition of claim 1 wherein the colorant comprises a pigment and a dispersant.
3. The ink composition of claim 2 wherein the dispersant is a polymeric dispersant.
4. The ink composition of claim 1 wherein $a+b=7$ and $n=1-2$.
5. The ink composition of claim 1 wherein $a+b=6$ and $n=1-2$.
6. The ink composition of claim 1 wherein $n=1$.
7. The ink composition of claim 1 wherein $n=2$.

8. The ink composition of claim 1 wherein the penetrant is di-n-propyl sulfoxide.

9. The ink composition of claim 1 wherein the penetrant is di-n-propyl sulfone.

10. The ink composition of claim 1 wherein the penetrant is ethyl-n-propyl sulfone.

11. The ink composition of claim 1 wherein the penetrant is n-butyl-n-propyl sulfone.

12. The ink composition of claim 2 wherein the pigment comprises particles having a median particle size of approximately 0.01 to 0.3 micron.

13. The ink composition of claim 3 wherein said polymeric dispersant comprises a block copolymer and wherein the ink composition comprises approximately 0.1 to 8% pigment, 0.1 to 8% block copolymer, and 94 to 99.8% aqueous carrier medium plus sulfoxide or sulfone penetrant based upon the total weight of the ink composition.

14. The ink composition of claim 1 wherein the aqueous carrier medium comprises water and at least one water soluble organic solvent.

15. The ink composition of claim 14 wherein the aqueous carrier medium comprises from 30% to 95% water based on the total weight of the aqueous carrier medium plus sulfoxide or sulfone penetrant.

16. The ink composition of claim 1 wherein said colorant is a dye and wherein said ink composition comprises approximately 0.2 to 20% dye, and 80 to 99.8% aqueous carrier medium plus sulfoxide or sulfone penetrant, based on the total weight of the ink composition.

17. The ink composition of claim 1 wherein the aqueous carrier medium is a mixture of water and at least one water soluble organic solvent having at least 2 hydroxyl groups.

18. The ink composition of claim 1 wherein said ink composition has a surface tension of approximately 20 to 70 dyne/cm and a viscosity of no greater than 20 cP at 20° C.

19. The ink composition of claim 1, wherein a surfactant is present.

* * * * *